Feb. 18, 1958 H. W. MORGAN 2,823,787
APPARATUS FOR HANDLING SHELL CASINGS AND THE LIKE
Filed May 24, 1954 11 Sheets-Sheet 1
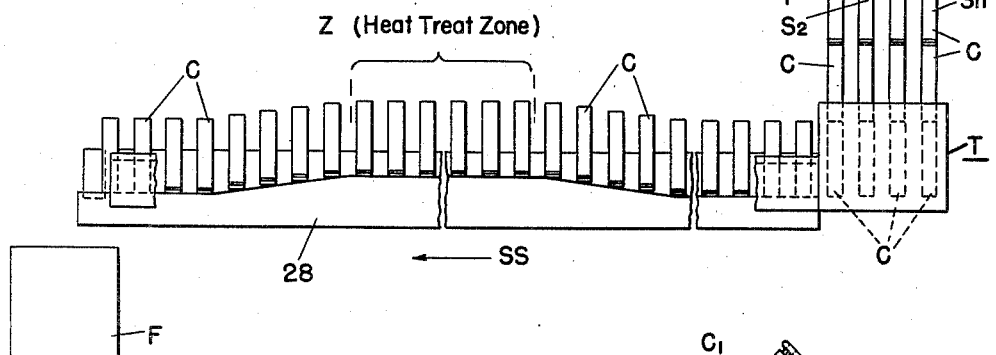
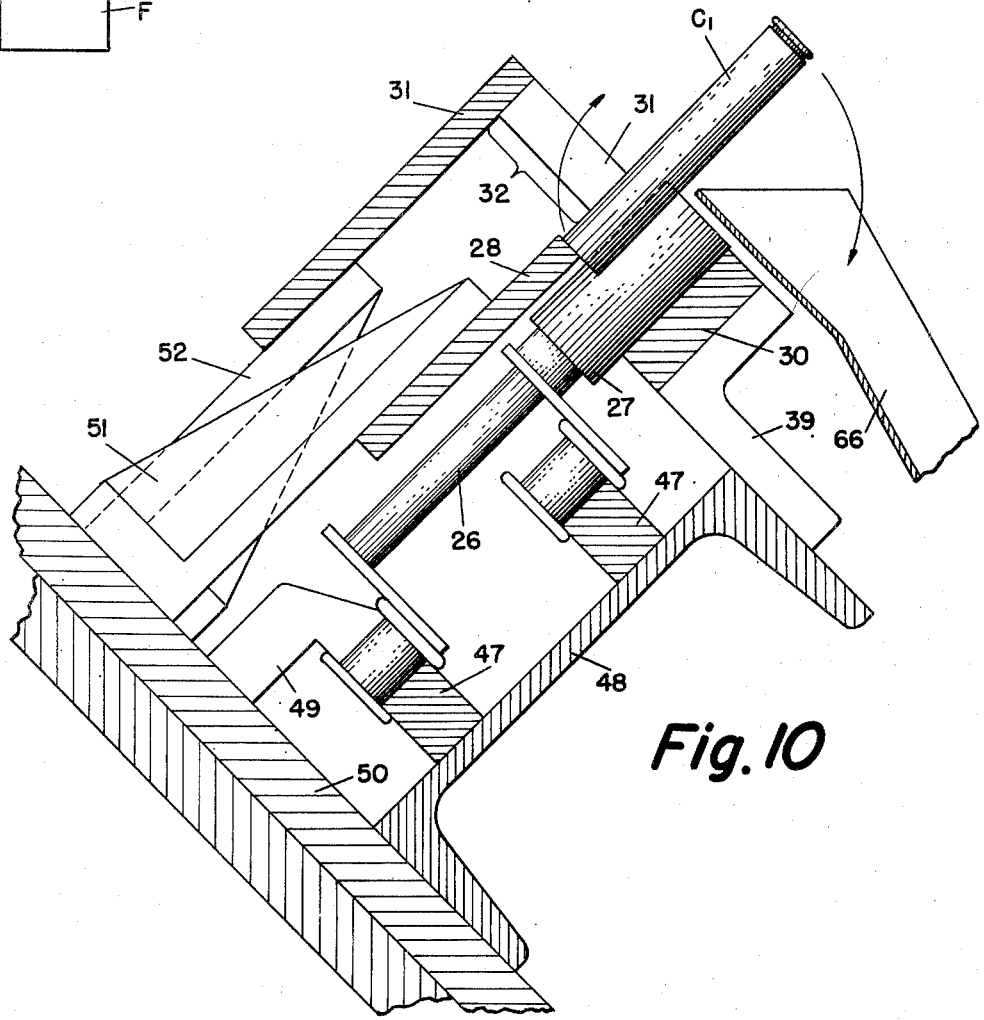

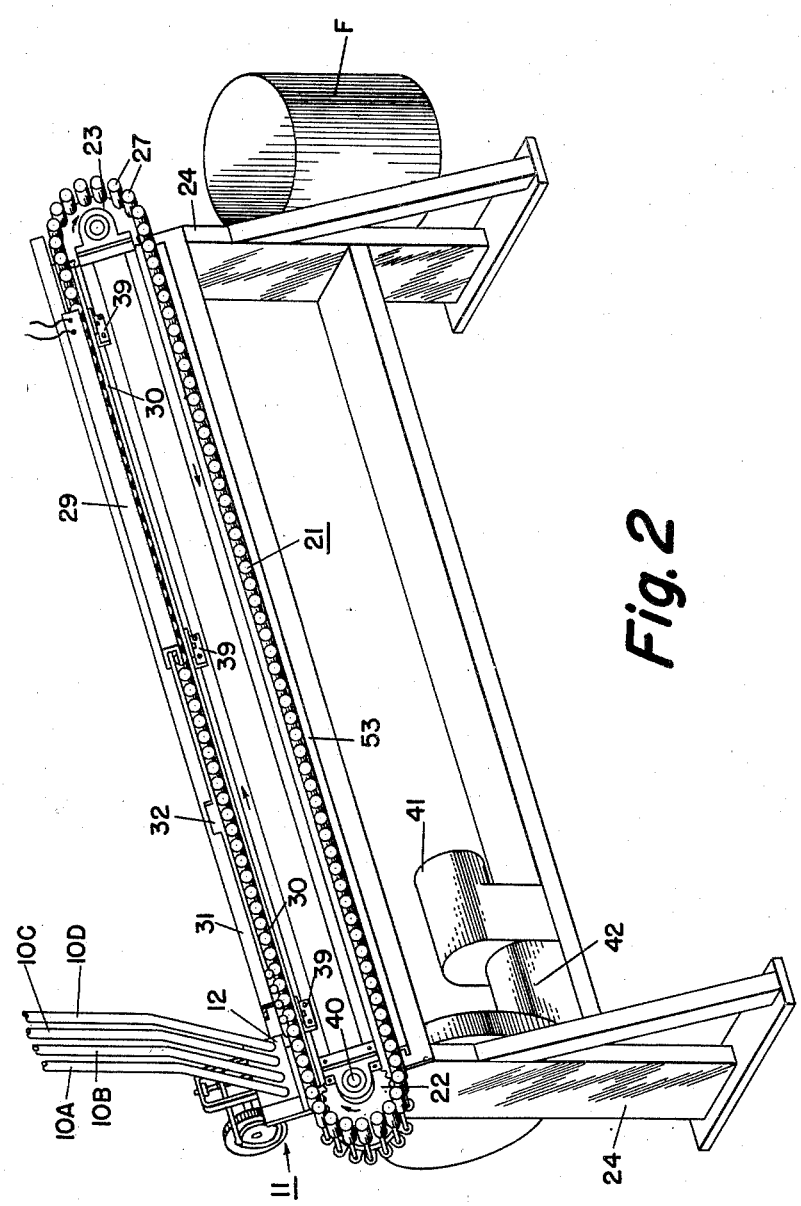

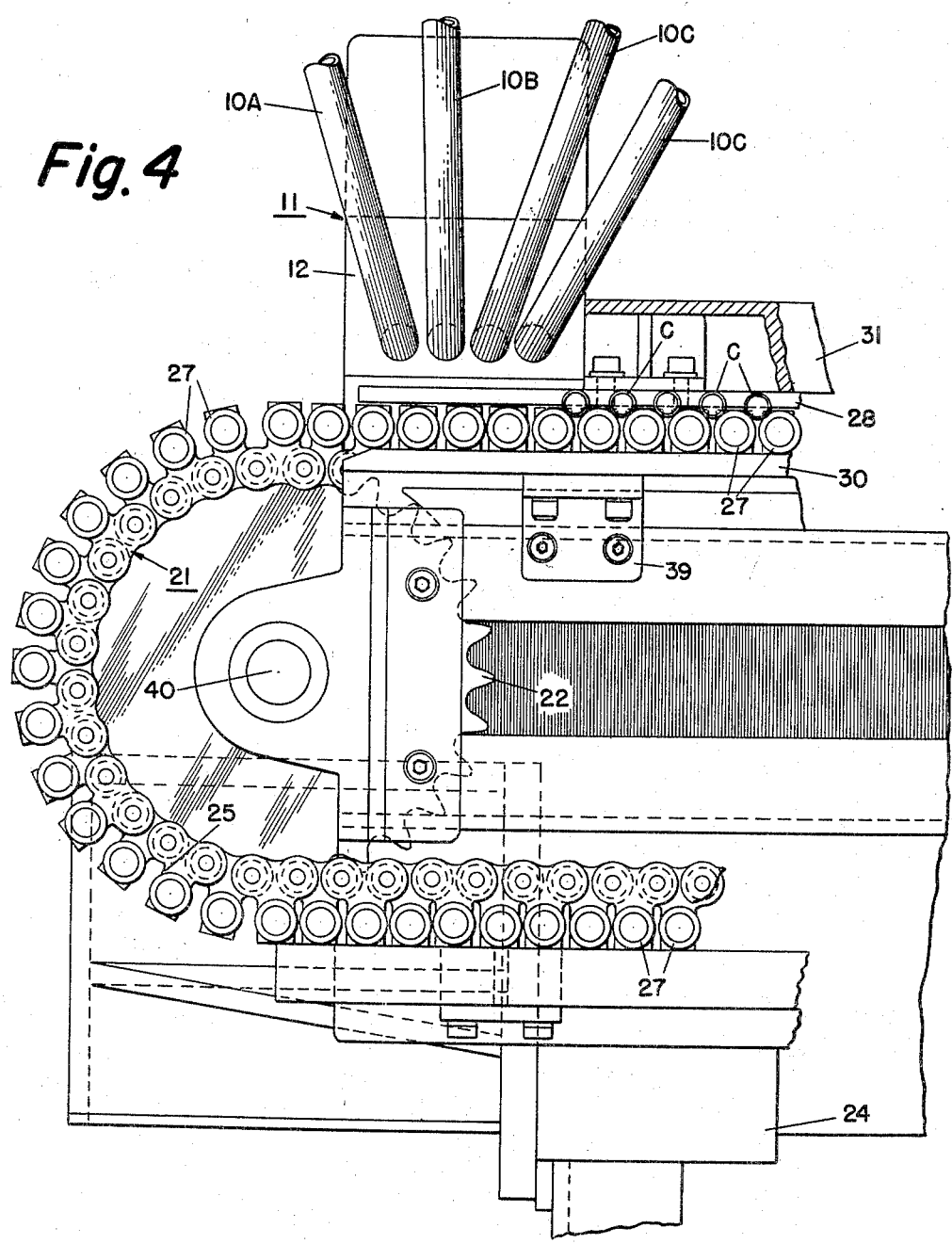

Feb. 18, 1958 H. W. MORGAN 2,823,787
APPARATUS FOR HANDLING SHELL CASINGS AND THE LIKE
Filed May 24, 1954 11 Sheets-Sheet 5
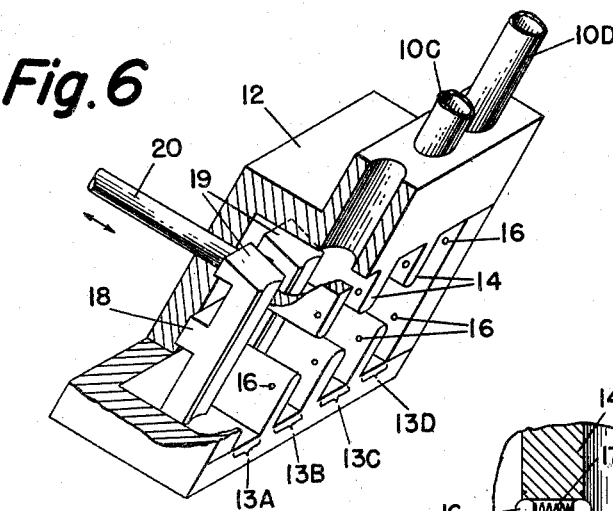
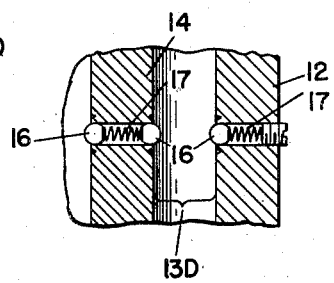
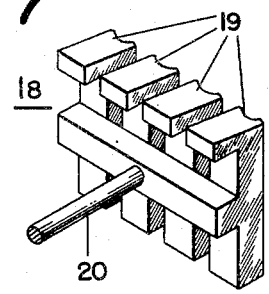
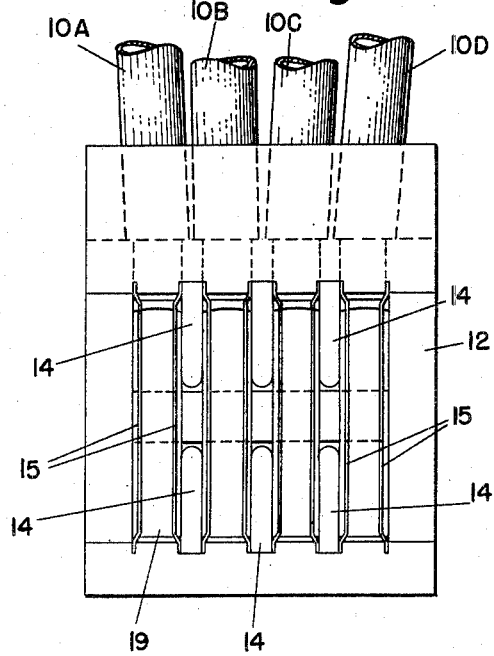
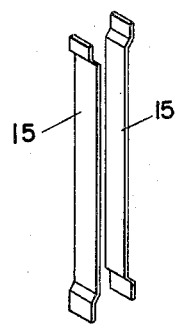

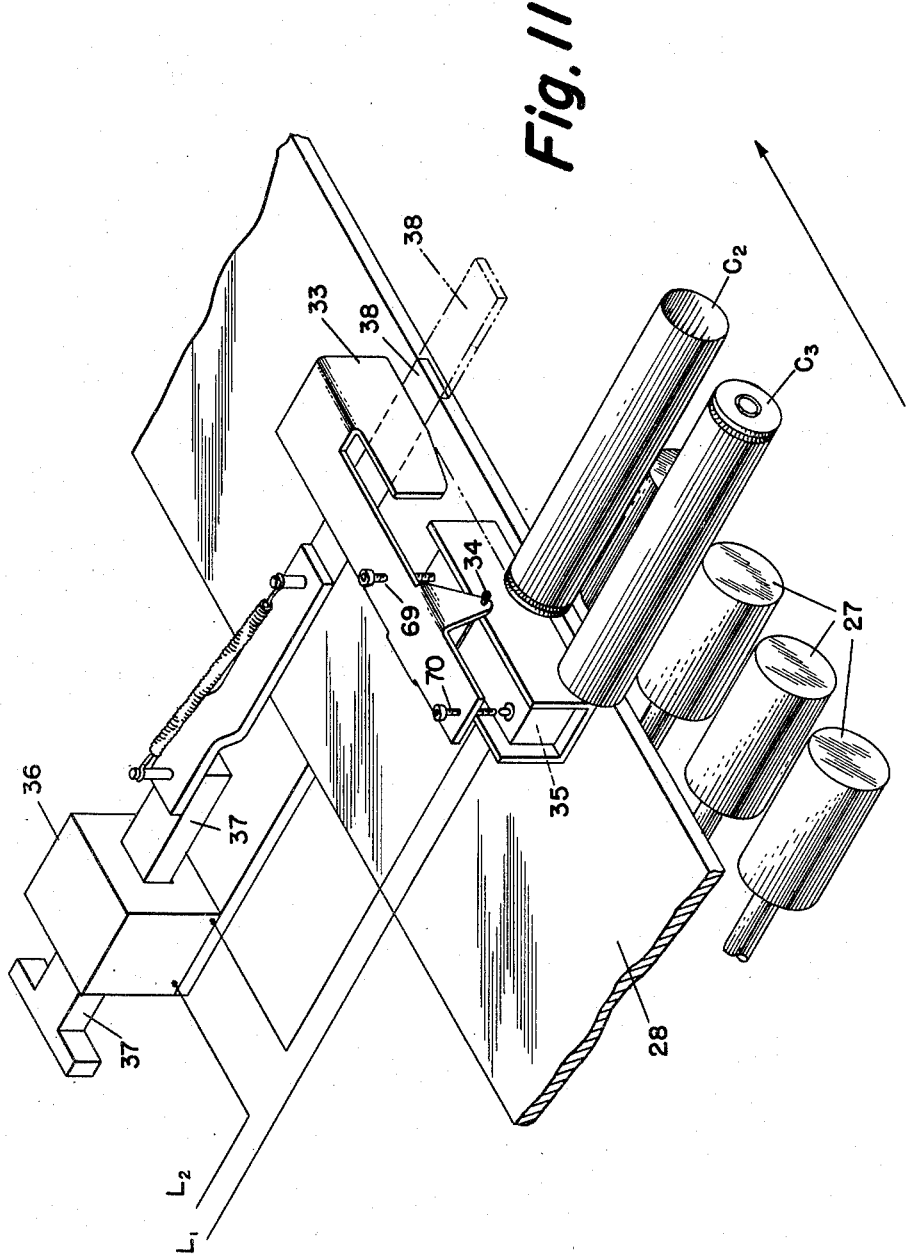

Feb. 18, 1958 H. W. MORGAN 2,823,787
APPARATUS FOR HANDLING SHELL CASINGS AND THE LIKE
Filed May 24, 1954 11 Sheets-Sheet 8
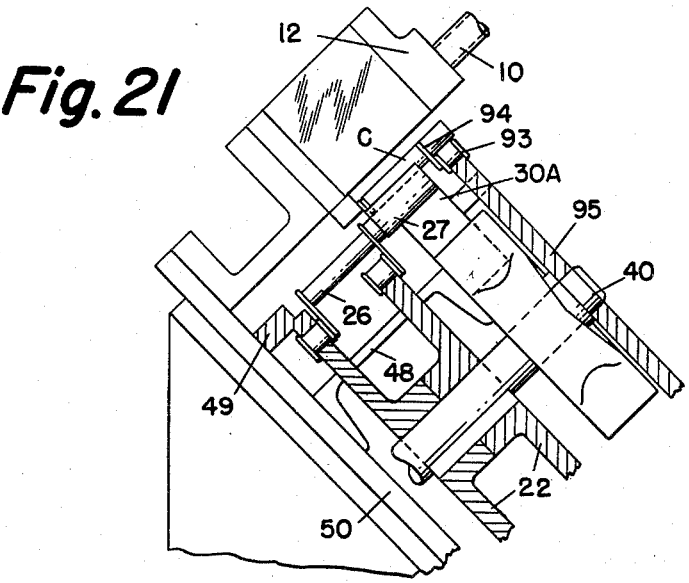
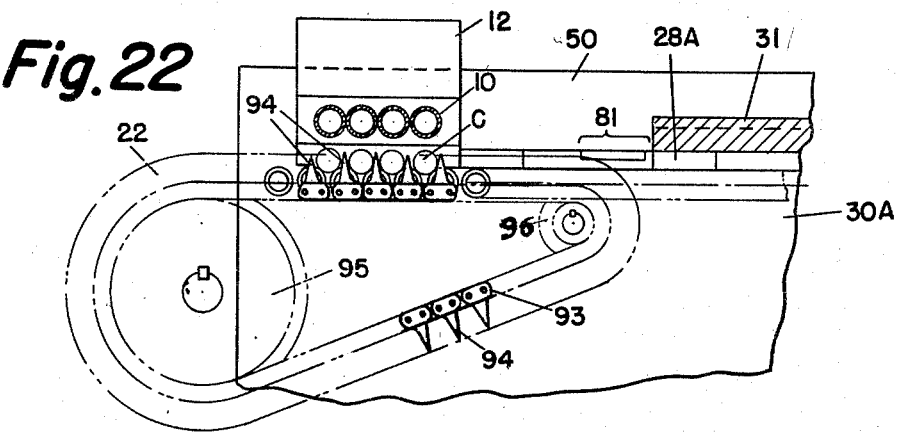
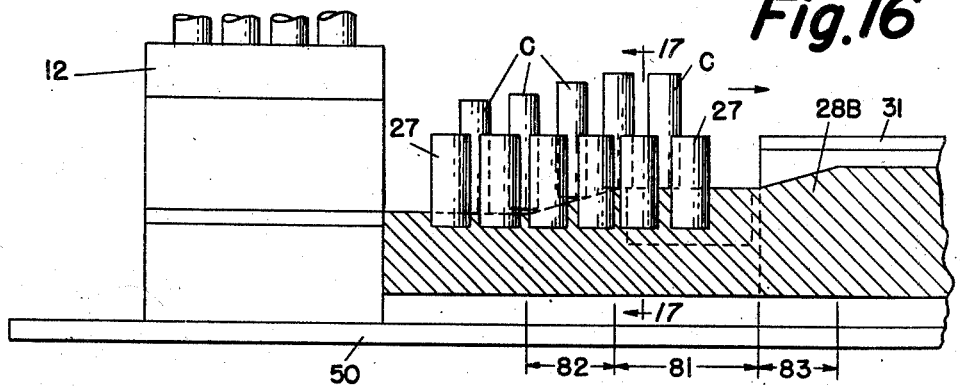

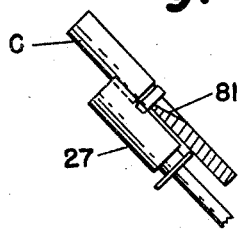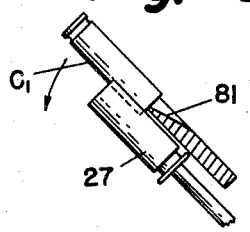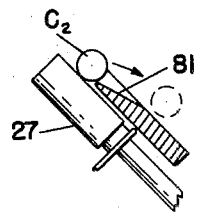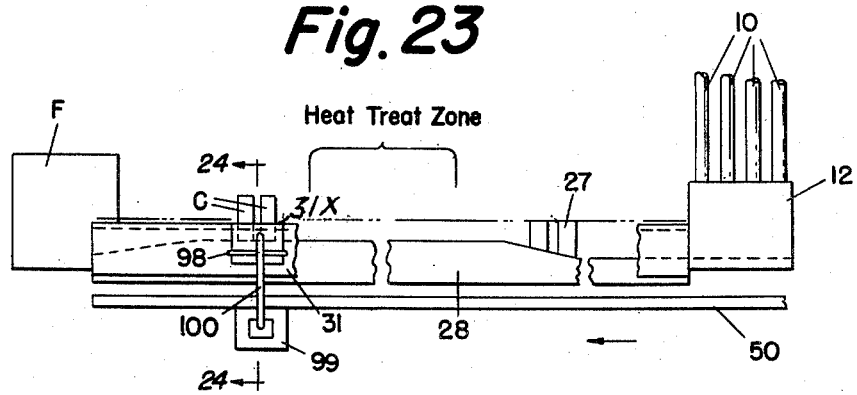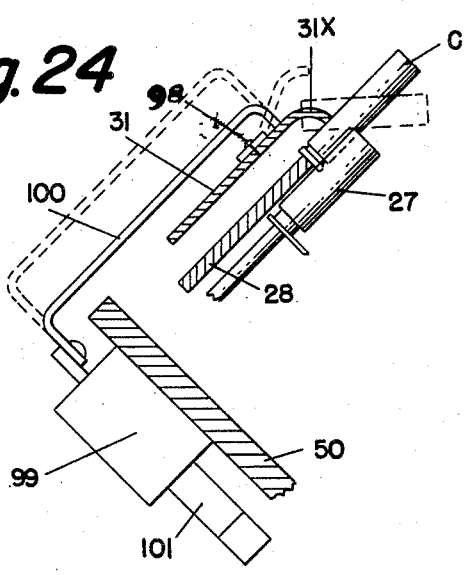

Feb. 18, 1958 H. W. MORGAN 2,823,787
APPARATUS FOR HANDLING SHELL CASINGS AND THE LIKE
Filed May 24, 1954 11 Sheets-Sheet 11
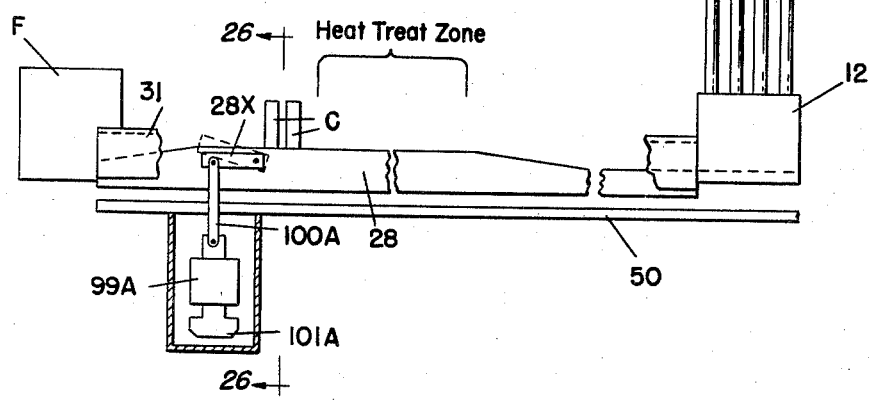
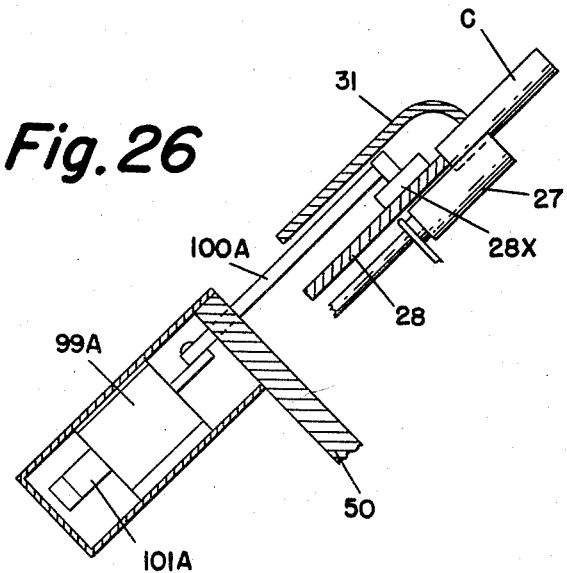

United States Patent Office 2,823,787
Patented Feb. 18, 1958

2,823,787

APPARATUS FOR HANDLING SHELL CASINGS AND THE LIKE

Harry W. Morgan, Wilmington, Del., assignor to Jennings Machine Corporation, Philadelphia, Pa., a corporation of Pennsylvania Application May 24, 1954, Serial No. 431,715

11 Claims. (Cl. 198—32)

This invention relates to apparatus for handling shell casings and the like during their manufacture.

In accordance with aspects of the present invention, the casings are fed, as by gravity, from a plurality of sources as continuous streams in each of which the casings are in end-to-end relation. At a transfer station, the end casings of the several streams are segregated as a group in side-by-side relation and in such relation, with other groups previously and subsequently so segregated, are fed in a single stream to and through a treating zone in which, for example, they are subjected to and annealing operation. While in such single stream, the casings are inspected and any improperly oriented casing is removed, preferably in advance of the treating zone, in avoidance of delivery to the drawing station of any casings which are not properly annealed.

In accordance with other aspects of the invention, an endless conveyor is provided with pockets or troughs for receiving, in side-by-side relation, casings delivered thereto by a reciprocating transfer mechanism which in each cycle receives a number of casings from a corresponding number of delivery tubes or equivalent. More particularly, the conveyor pockets are formed by rollers which rotate the casings, at least during their transport through the treating zone, to insure uniformity of their treatment. More specifically, as the casings approach the treating zone, they are displaced, as by stationary cam structure adjacent the conveyor, so that the proper ends of the casings are caused to project to desired extent into the treating zone for localized treatment.

Further in accordance with the invention, means are provided to remove from the conveyor any casing which is not oriented properly for annealing of the desired end of such casing. Specifically, such means may utilize the difference between the centers of gravity of properly and improperly oriented casings, or it may utilize their difference in shape at a predetermined reference line along their path of travel.

The invention further resides in features of construction, combination and arrangement hereinafter described and claimed.

For a more detailed understanding of the invention, reference is made to the accompanying drawings in which:

Fig. 1 is an explanatory figure referred to in discussion of method aspects of the invention;

Fig. 2 is a perspective view of a machine embodying the invention;

Fig. 4 illustrates the mechanism of Fig. 3 as viewed in the plane 4—4 of Fig. 3;

Fig. 5 is a detail view, in front elevation, of the transfer mechanism of Figs. 2–4;

Fig. 6 is a perspective view, partly broken away, of a modification of the transfer mechanism of Fig. 5;

Fig. 7 is a perspective view of a transfer slide shown in Figs. 5 and 6;

Fig. 8 is a detail view, in perspective, of retainer springs shown in Fig. 5;

Fig. 9 is a partial front elevational view, in section, of the modified spring retainers shown in Fig. 6;

Fig. 10 is an end elevational view, in section, of a casing-rejection arrangement usable in the machine of Fig. 2;

Fig. 11 is a perspective view of an alternative arrangement for rejecting improperly oriented casings;

Figure 3:
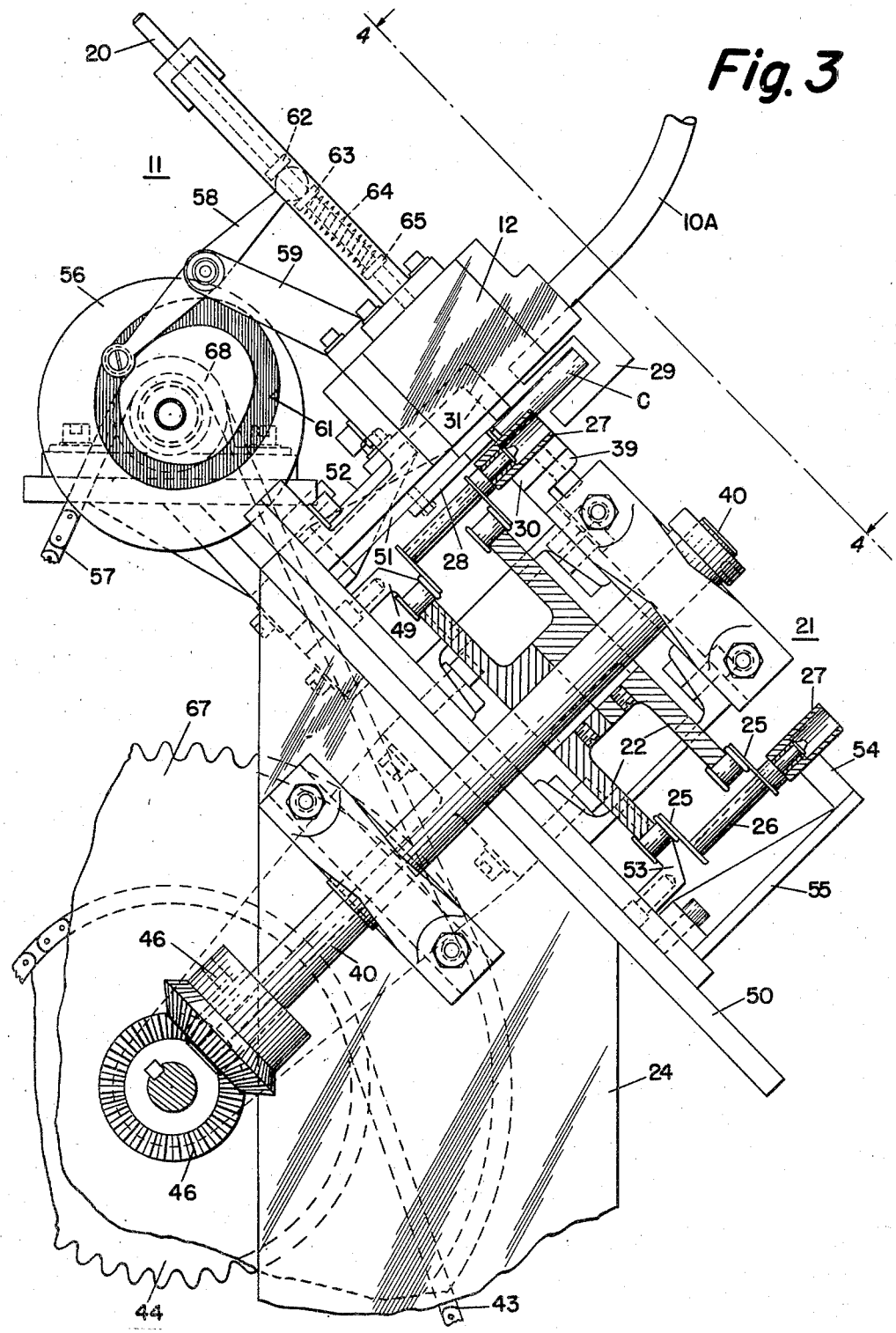
Fig. 3 is an end elevational view, on enlarged scale and partly in section, of conveyor and transfer mechanism shown in Fig. 2.
Figure 18:
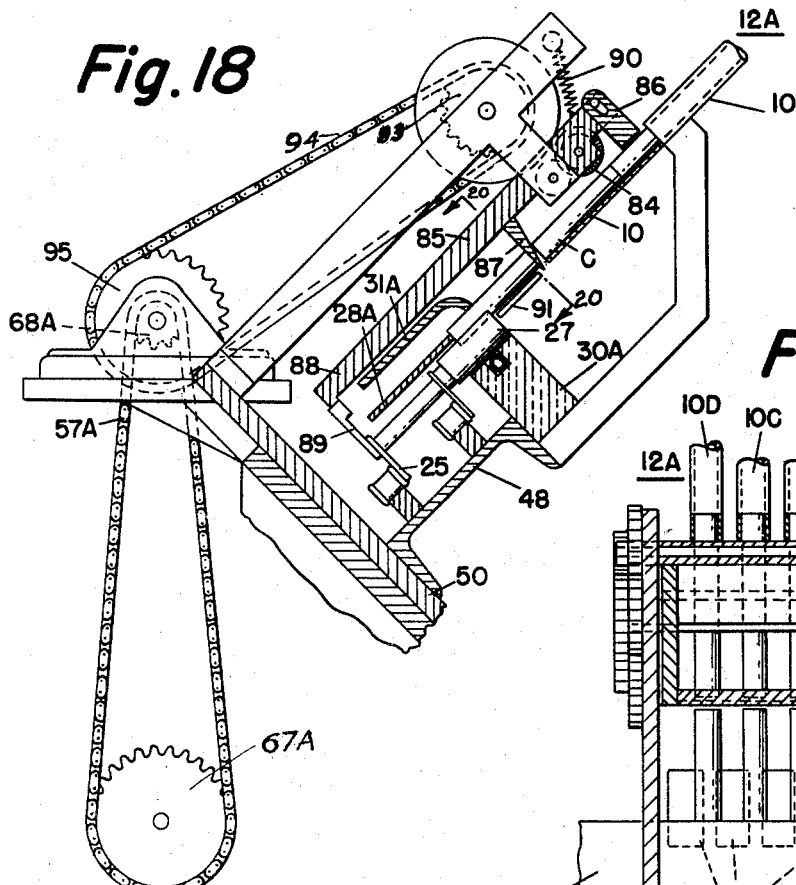
Figure 19:
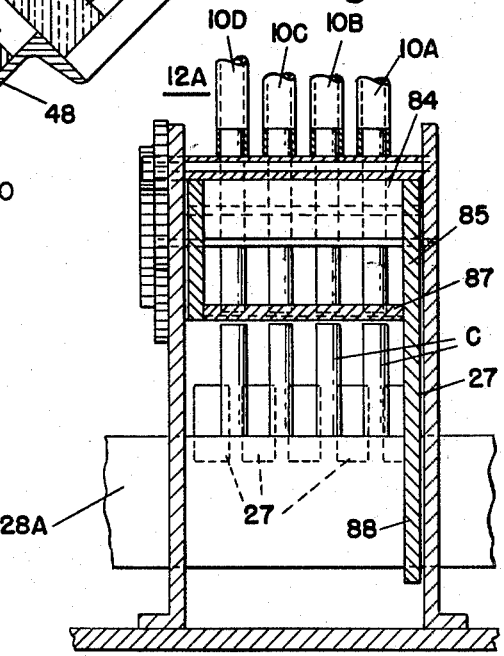
Figure 20:
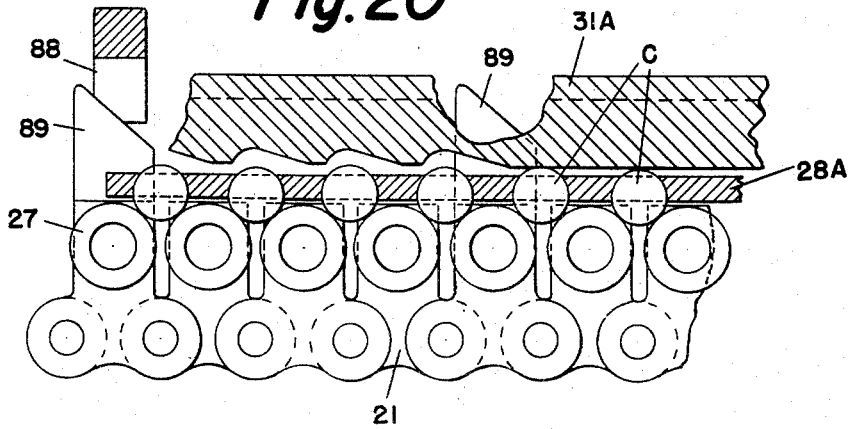

Fig. 16 schematically illustrates an arrangement for removal of improperly oriented casings;

Figs. 17A–17C are sectional views taken on line 17—17 of Fig. 16 and with different orientations of the casings;

Fig. 18 is an end elevational view, in section, of a modified form of transfer mechanism;

Fig. 19 is a front elevational view, partly in section, of parts appearing in Fig. 18;

Fig. 20 is a sectional view taken on line 20—20 of Fig. 18;

Fig. 21 is an end elevational view, in section, showing parts appearing in Fig. 3 with addition of an auxiliary trough mechanism adjacent the transfer mechanism;

Fig. 22 is a front elevational view of parts appearing in Fig. 21;

Fig. 23 is a rear view of an arrangement for rejecting unannealed casings;

Fig. 24, on enlarged scale, is a sectional view taken on line 24—24 of Fig. 23;

Fig. 25 is a rear view of a further arrangement for rejecting unannealed casings; and Fig. 26, on enlarged scale, is a sectional view taken on line 26—26 of Fig. 25.

In the manufacture of shell casings and like hollow tubular articles, they are subjected to several drawing operations which harden them to extent requiring annealing between successive draws. In accordance with the method of handling exemplified by Fig. 1, the casings C to be annealed are fed end-to-end in a plurality of streams S1—Sn toward a transfer station exemplified by block T. The casings of the several streams are similarly oriented; specifically, as shown, the closed or primer ends of the casings are foremost in the direction of feed. At the transfer station, the group formed by the end casings of the respective streams is segregated and the shells of this group are transported in side-by-side relation toward the treating zone Z. When this group clears the transfer station, the next group of end casings, which in the meantime have been delivered to the transfer station, is similarly segregated and added to the single stream SS of side-by-side casings. Thus, by repeated segregation and transfer, the several streams of end-to-end casings are converted to a single stream of casings disposed side-by-side with their open end portions at the same side of the stream for passage through the treating zone Z.

As the casings are moved toward the treating zone in stream SS, they are displaced laterally of their direction of feed so that the open ends thereof project to desired extent into the treating zone as defined, for example, by the high-frequency field of an induction heating coil, the flame area of a plurality of gas jets or the like. At least during their passage through this treating zone, the casings are rotated about their axes to insure proper uniformity of their temperature at and adjacent the open ends thereof.

The length of the treating zone and the rate at which the stream SS moves insures that the ends of the casings have all reached annealing temperature before they pass out of the treating zone. The casings continue their movement beyond the treating zone Z in stream SS for a time or distance sufficient for return of their temperature to approximately room temperature. The annealed casings may be collected in a container F at the end of stream SS for transport in bulk to the next drawing station or they may be discharged into a hopper for delivery to such station.

During travel of the casings in the single stream SS, they are inspected and any casing which is reversely oriented is removed from the stream preferably in advance of its passage through zone Z, and in any event before its arrival at the container F or equivalent. It is thus insured that no casing will be delivered to the next drawing station unless its open end has been annealed.

Having thus described the method, without reference or limitation to any particular mechanism for performing it, there is now described a preferred machine which automatically and rapidly performs all of the steps above described.

Referring to Figs. 2–5, the tubes 10A–10D are of internal diameter slightly larger than the shell casings which are delivered to them, closed end downward, as by the discharge hoppers of machines (not shown) which orient the casings. Thus, within each of the conveyor tubes 10A–10D, there is a column or row of casings, the upper open end of each casing being engaged by the closed bottom end of the casing next above it.

The lower ends of tubes 10A–10D are received by block 12 of a transfer mechanism 11. As best shown in Figs. 5 and 6, the block 12 is provided with a series of vertically-inclined compartments 13A–13D, one for each of delivery tubes 10A–10D and forming an effective continuation thereof. The side walls of these compartments are defined by the partial partition members 14 and by the end walls of block 12.

The width and height of each compartment correspond respectively with the diameter and length of an individual shell casing. The bottom of the compartments are closed to serve as a stop for the columns of casings in the feed tubes 10A–10D so that block 12 serves as a terminus of the several supply streams of casings. The front walls of the compartments are open and downwardly inclined, but the end casings are yieldingly restrained therein—preferably by either of the two arrangements now described.

In the particular arrangement shown in Figs. 5 and 8, such restraint of the casings within block 12 is afforded by pairs of leaf springs 15. The opposite ends of each pair of springs 15, 15 are respectively received by grooves in the top and bottom walls of the corresponding compartment: the free, intermediate portions of the springs are bowed or bent toward one another clear of the side walls of the compartment so that the spacing between them is somewhat less than the diameter of a shell casing. Thus, although the block 12 is inclined downwardly (Fig. 3), the casings therein do not fall out of their respective compartments 13A–13D because of their engagement with the springs 15—15.

In the alternative arrangement shown in Figs. 6 and 9, such restraint of the casings delivered into block 12 is afforded by a series of balls 16 biased by springs 17 to project from the side walls of the respective compartments 13A–13D. The spacing between the balls on opposite sides of the same compartment is somewhat less than the diameter of a shell casing. Thus, this arrangement also yieldingly restrains the end casings of the rows within their respective compartments.

In timed relation to operation of conveyor mechanism 21, later described, the successive groups of casings delivered to block 12 by tubes 10A–10D are pushed out of block 12 by a reciprocating transfer slide 18. As best shown in Figs. 6 and 7, this slide comprises a series of back-wall members 19, one for each of compartments 13A–13D of block 12. As the slide 18 is moved forwardly from the retracted position shown in Fig. 6, its members 19 push the casings out of the compartments 13A–13D against the restraint of springs 15 (Figs. 5, 8) or of the spring-pressed balls 16 (Figs. 6, 9).

As the slide 18 is retracted to the position shown in Fig. 6, the tops of members 19 clear the lower ends of the delivery tubes 10A–10D. Consequently the next group of casings fall end-on into the compartments 13A–13D, and each row of casings in the delivery tubes 10A–10D advance a distance corresponding with the length of a casing.

As each successive group of casings is segregated by the transfer mechanism 11 and pushed out of block 12 thereof, the individual casings of that group are received by a corresponding number of pockets or troughs of an endless conveyor 21 now described.

Referring to Figs. 2–4, the conveyor 21 comprises two parallel chains which pass over dual sprockets 22, 23 at opposite ends of a supporting frame 24. Each pair of corresponding links 25 of the chains supports a shaft 26 for an elongated roller 27. The space between the transfers of each adjacent pair of rollers 27 is suitably less than the diameter of a casing C so to form a pocket or trough. The center-to-center spacing of rollers 27 corresponds with the center-to-center spacing of the compartments 13A–13D of block 12.

By synchronizing the reciprocation of transfer slide 18 to the continuous movement of conveyor 21, a group of empty pockets of conveyor 21 is in position to receive a group of casings from block 12 for each cycle of the slide 18, and in the interval between discharge of successive groups of casings from block 12, the conveyor is advanced to present the next group of empty pockets adjacent the block 12. Thus, beyond the transfer mechanism 11, the conveyor pockets each contains a shell casing with its axis normal to the direction of movement of the conveyor.

The pockets or troughs formed by rollers 27 are open at both ends. Since the conveyor faces are inclined, the shell casing C would therefore slide out except for the stationary plate 28 (Figs. 3, 10) which extends along the upper flight of the conveyor to engage the lower ends of the casings in the conveyor pockets. As best shown in Fig. 1, the plate 28 serves as a stationary cam which progressively moves the casings upwardly as they are advanced toward the heating coil 29 (Fig. 2). Thus, the casings are moved transversely of their direction of feed so that the open ends of the casings project to desired extent beyond the rollers 27 and into the high-frequency field of the U-shaped heating coil 29 or into an equivalent heating zone.

To effect rotation of the casings, at least during their passage through the heating zone, the rollers 27 of the upper flight of conveyor 21 ride upon the bar or rail 30 supported by brackets 39 and the casings are engaged, top side, by the pressure bar 31 (Figs. 2, 10) extending parallel to rail 30.

Preferably in advance of the heating coil 29, or equivalent, the upper bar 31 is provided with a notch 32 (Figs. 2, 10). At this point of their travel, the casings have been pushed upwardly to project substantially beyond the upper end of rollers 27. If the casing is properly oriented, i. e., closed end downward, its center of gravity is such that the casing remains in the conveyor pocket. On the other hand, if the casing, such as casing C1 of Fig. 10, is reversely oriented, its center of gravity is high with the result that the overbalanced casing pivots about the upper end of its supporting rollers and falls off the conveyor 21 into a rejection chute 66. Thus, any casing which is improperly oriented is rejected and not permitted to travel along with other casings properly annealed for the subsequent drawing operation.

An alternative form of rejection arrangement is shown in Fig. 11. In this modification, a pivoted feeler or detector arm 33 is disposed in the path of the primer-cap grooves of properly oriented casings (such as casing C2). The feeler 33 remains at rest so long as the casings passing below it are properly oriented, the lower edge of the feeler being clear of the casings because, of its alignment with the grooves. If a reversely oriented casing (such as casing C3 of Fig. 11) passes beneath the feeler, the feeler is raised by engagement with the ungrooved diameter and pivots about pin 34 to effect closure of the contacts of a micro-switch 35. The solenoid 36 is thus energized and the resulting movement of its core 37 actuates ejector-slide 38 to kick the improperly oriented casing off of the conveyor. The gaging position to which the feeler 33 is biased by gravity, or by spring means not shown, may be precisely adjusted by stop screw 69 or equivalent. The extent to which detector arm 33 must be rocked to effect actuation of the solenoid switch 35 may be precisely adjusted by a second stop screw 70.

The shaft 40 of the driving sprocket 22 of conveyor 21 is driven from motor 41 (Fig. 2) through a speed reducer 42, chain 43 (Fig. 3), sprocket 44 and bevel gears 46, 46. The axes of the shaft 40 and of the corresponding shaft for the idler sprocket 23 are inclined so that the face of the upper flight of the conveyor is substantially parallel to the lower inclined open face of the transfer block 12. To prevent sagging of the upper flight of the conveyor intermediate the sprockets 22, 23, there are provided the guide rails 47 (Fig. 10) which extend from frame member 48 for straddling engagement by the two chains of the conveyor; this same frame member 48 supports the brackets 39 for the roller bar 30. The lower of the two chains of the top flight may also be guided by rail member 49 extending upwardly from frame member 50: from this frame member 50 may also upwardly extend the brackets 51 which support the cam plate 28 and the brackets 52 which support the pressure bar 31.

The lower flight of the conveyor is precluded from sagging by the guide rail 53 (Fig. 3) supported from frame member 50 for engagement with the lower chain and by the bar 54 supported by brackets 55 which extend upwardly from frame member 50 for engagement of bar 54 by rollers 27.

The drive mechanism for effecting reciprocation of slide 18 of the transfer mechanism in synchronism with the movement of conveyor 21 is now described. Referring to Fig. 3, the cam 56 is driven by chain 57 and sprockets 67, 68 so that it actuates the operating rod of transfer slide 18 once for each advance of the conveyor 21 through a distance corresponding with the number of compartments in the transfer block 12. More particularly, the arm 58 pivotally supported by bracket 59 from block 12 has at one end a cam follower received by the groove 61 of cam 56. The other end of arm 58 is received between two stops 62, 63 respectively attached to and slidable along the operating rod 20 of transfer slide 18. The slidable stop 63 is biased against the arm 58 by compression spring 64 disposed between the slidable stop 63 and a second stop 65 attached to rod 20.

As the arm 58 is rocked in clockwise direction, the spring 64 is compressed so that the members 19 (Fig. 6) of the slide 18 exert pressure upon the casings within compartments 13A–13D of block 12. When this pressure overcomes the restraint of springs 15 (Fig. 5), or the spring-biased balls (Fig. 6), the casings are simultaneously ejected from block 12 into the aligned troughs of conveyor 21. The forward limit of the follow-up travel of slide 18 is determined by engagement of fixed stop 62 with arm 58. As arm 58 is rocked in reverse direction by cam 56, the slide 18 is retracted to permit the next group of casings in the delivery tubes 10A–10D to fall into the respective compartments 13A–13D of block 12 in readiness for the next reciprocation of the slide 18.

With the mechanism of Figs. 2–11, above described, the method of Fig. 1 can be performed automatically and at high rate, for example .30 caliber casings can be annealed at the rate of approximately 300 per minute. It shall be understood, however, that such method may be performed manually, in whole or in part, or by specifically different mechanism.

Figure 12:
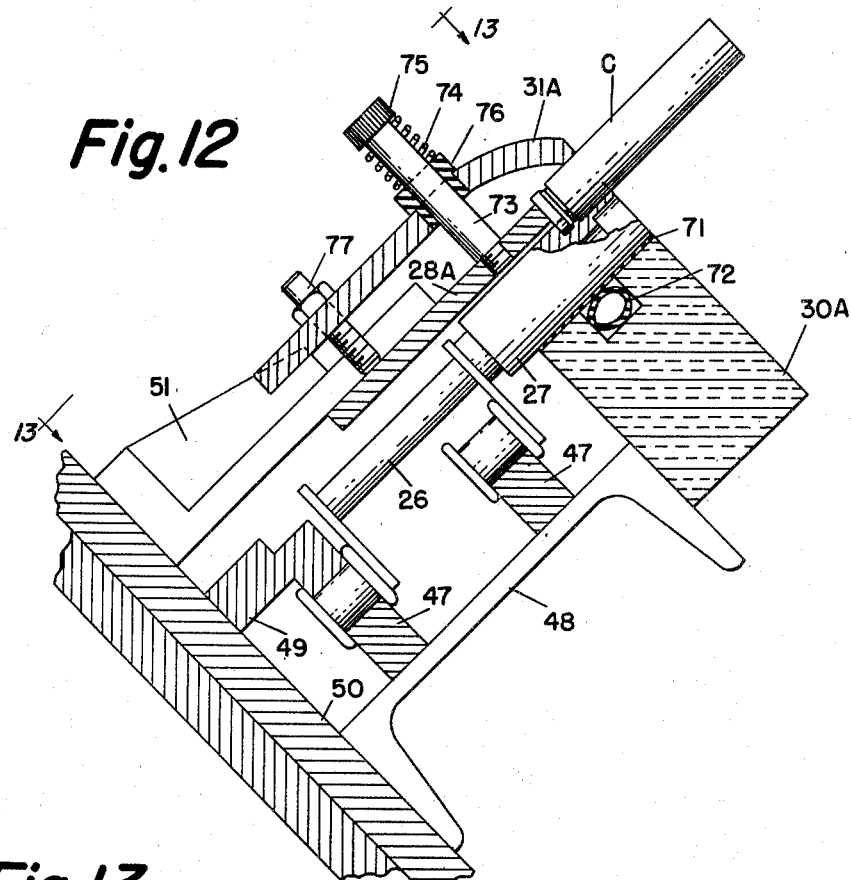
Fig. 12 is an end-elevational view, in section, of a modification of parts shown in Fig. 10.

The construction shown in Fig. 12 is generally similar to that illustrated in Fig. 10 but specifically differs therefrom in that it shows several improvements, any or all of which may be incorporated in the arrangement of Fig. 10.

In Fig. 12, the bar 30A for engaging the underside of conveyor rollers 27 is provided with a facing 71 of yieldable material such as rubberized asbestos having a rather high coefficient of friction continuously to insure rotation of the casings during their passage through the heating zone despite irregularities or wear of the rollers or of their bearings or supports. Also to such end and for obtaining substantial uniformity of the pressure applied to rollers 27, the face of bar 30A may be recessed to receive a length of tubing 72, of rubber, or the like, whose diameter may be somewhat less than the depth of the recess. As the rollers 27 are moved along the track bar 30A by the conveyor chain, the pressure exerted upon them directly or through the deformable facing 71 by the resilient tubing 72 continuously insures their rotation about their supporting shaft 26 or equivalent. In the preferred arrangement shown, the tubing 72 is protected against undue temperature rise by the asbestos facing 71 interposed between it and the rollers 27.

Figure 13:
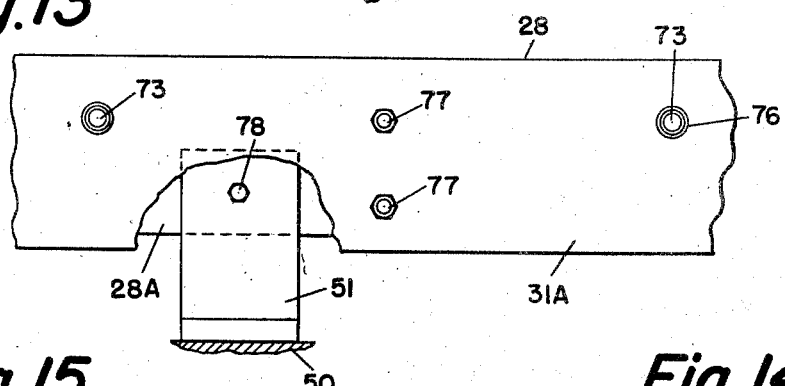
Fig. 13 is a view taken in the direction of the arrows 13—13 of Fig. 12.

In the arrangement shown in Fig. 10, the cam plate 28 and the pressure bar 31 are independently supported from frame member 50 by two sets of brackets 51, 52, whereas in the construction shown in Figs. 12 and 13, the pressure bar 31A is supported from cam plate 28A which in turn is supported from frame member 50 by a single set of brackets 51. At spaced intervals along cam plate 28A, there extend from it a series of studs 73 which project through the pressure bar or plate 31A. As shown in Fig. 12, each stud 73 is encircled by a spring 74 which is compressed between a pressure-adjusting nut 75 and a bushing 76 of insulating material. The insulating bushing 76 is provided to avoid circulation of currents induced by the annealing coil (not shown). The stops 77 attached to pressure plate 31A and engageable by cam plate 28A are so adjusted that with the conveyor free of casings, the pressure-applying end of plate 31A is biased by spring 74 to a position from which it is somewhat raised by engagement with casings in the troughs between the conveyor rollers 27.

Figure 15:
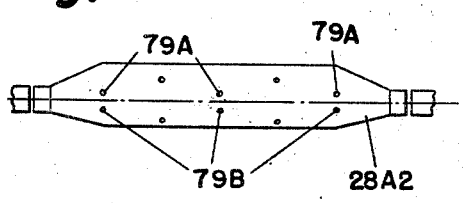
Figs. 14 and 15 illustrate modifications of a cam plate shown in preceding figures.
Figure 14:
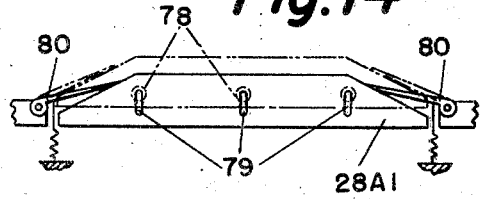

For adjustment of the extent to which the casings are displaced to extend beyond rollers 27, two alternative arrangements are shown in Figs. 14 and 15.

As shown in Fig. 14, the cam plate 28A1 may be provided with a series of slots or elongated holes 79 through which pass the bolts 78 for clamping it to the supporting brackets 51. The elongation of the bolt holes permit the cam plate to be clamped in any of various positions determining the extent to which the casings are laterally shifted during their travel with conveyor 21. Specifically, with the cam plate 28A1 clamped in the full-line position of Fig. 14, the casings are displaced only to such extent that their tips are subjected to annealing, whereas with the cam plate clamped in the position indicated by the dotted lines, the casings are laterally displaced to such greater extent that the annealing extends well into the body section. When this adjustable type of cam plate is used, gates or wings 80 are preferably provided to cooperate with the "rise" surfaces at the ends of the cam plate to provide smooth advance and retraction of the casings for the different selected positions in which cam plate 28A1 may be clamped. When provided with such cam plate, the same machine may be used, for example, both for casings to be end-annealed and for casings to be body-annealed.

Alternatively, the machine may be provided with a reversible cam plate 28A2, such as shown in Fig. 15, having its opposite edges contoured to provide different extents of lateral movement of the casings. Cam plate 28A2 is provided with two sets of holes 79A, 79B for receiving the clamping bolts 78 (Fig. 13). With the clamping bolts passed through one set of holes (79A), the upper edge of the cam plate, as viewed in Figs. 10 or 12, is set for end-annealing of the casings whereas with the cam plate reversed and the bolts 78 passed through the other set of holes 79B, the upper edge of the cam plate is set for body-annealing of the casings.

In Figs. 16 and 17A–17C, there is shown an arrangement for removing improperly oriented casings from the conveyor before they are laterally displaced to the extent required for annealing. Along the path of travel of the casings from transfer mechanism 12 to the region where they are fully laterally displaced, the cam 28B is contoured to provide a flat or dwell section 81 which is intermediate the first rise section 82 and the second rise section 83. By the time the casings have been advanced to the dwell section, their lateral displacement is such that if one of them is reversely oriented (Fig. 17B), its center of gravity is beyond the ends of conveyor rollers 27, and that casing consequently falls out of the machine before it reaches the pressure bar 31. On the other hand, if the casings are properly oriented between the conveyor rollers 27 (Fig. 17A), i. e., with the heavy primer end downward, their centers of gravity are still below the ends of the conveyor rollers 27 and they move along with the conveyor for further lateral displacement by the second rise section 83 of cam 28B. The pressure bar 31 overlies the second rise section of the cam because the extent of further lateral displacement affected by it is so great that otherwise even the properly oriented casings would fall off of the conveyor and out of the machine.

The upper face of the dwell section 81 of cam 28B may also be chamfered or beveled, with the thin free edge in position to engage the lowermost portion of the casings. If for any reason one of the casings is crosswise of the rollers, as in Fig. 17C, instead of in a trough between a pair of rollers, such casing rolls down the incline provided by the bevel and thence out of the machine.

In Figs. 18 to 20, there is shown a modified form of transfer mechanism 12A which may be used instead of the transfer mechanism 12 shown in Fig. 3. In transfer mechanism 12A, the upper faces of the delivery tubes 10A–10D are cut away at the discharge ends of the tubes to provide a corresponding number of transfer pockets. The end casing of each row is thus exposed for contact by brush 84, or equivalent, which is mounted on the angularly reciprocable frame 85. Upon this frame is also mounted a friction gripper 86 for engaging the partially exposed penultimate casing of each row. To the rockable frame 85 is also attached a stop bar 87 for engaging the lower ends of the bottom casings of the respective rows. Arm 88 of frame 85 is extended to project into the path of movement of the cams 89 (Figs. 18–20) movable with the conveyor chain 21.

In the particular machine using four delivery tubes, there is a cam 89 for every fifth roller 27. Thus, each time one of the successive groups of four-roller troughs moves into alignment with the transfer pockets, the corresponding cam 89 rocks the frame 85 in direction to retract the stop 87 and to effect engagement between brush 84 and the four casings in the transfer pockets. These casings are therefore positively and rapidly fed from the transfer pockets into the respective troughs of the conveyor. During this time, the friction bar 86 is in engagement with the next four casings temporarily to prevent their movement by gravity into the transfer pockets.

When cam 89 passes beyond arm 88, spring 90 returns frame 85 to its original position for which the retractable stop bar 87 again blocks the discharge ends of the transfer pockets. During this movement, the friction bar 86 is released to allow all of the casings in delivery tubes 10A–10D to move downwardly until the bottom casings of the rows are arrested by stop bar 87. Thus for each cycle of movement of frame 85, one group of casings is transferred to the conveyor troughs and another group of casings moves into the transfer pockets. Preferably and as shown in Fig. 18, the gap between the transfer pockets and the conveyor troughs is substantially bridged by a guide plate 91 or equivalent.

The brush 84 of the transfer mechanism preferably rotates continuously and may be driven by any suitable means. In the particular arrangement shown, it is driven by gear 92 rotatable about the pivotal axis of frame 85. Gear 92 is in turn driven from the conveyor drive through mechanism including a gear 93, chain 94, gear 95, gear 68A, chain 57A and gear 67A.

An advantage of the transfer mechanism 12A is that precise synchronism is maintained despite differences in the axial spacings of rollers 27 as may occur, for example, with wear or because of inevitable slight differences within manufacturing tolerances.

Another advantage is that the positive feed of the casings by brush 84, or equivalent, insures substantial uniformity of the transfer times of the successive groups of casings. Such positive feed mechanism is not specifically herein claimed: it is claimed in copending application Serial No. 614,645, filed October 8, 1956.

In Figs. 21 and 22, there is shown an attachment which may be used to overcome difficulties some times experienced in the transfer of casings to the conveyor troughs. In the particular construction shown, the conveyor troughs are effectively lengthened in the vicinity of the transfer device by provision of a second chain 93 running in synchronism with conveyor chain 21 and having teeth or projections 94. The gap between each adjacent pair of teeth is suited to receive the forward end of a casing projecting substantially beyond the ends of a pair of rollers 27. As shown in Fig. 22, such gap may be somewhat wider and deeper than the casing diameter, facilitating capture of a casing as it is impelled towards the conveyor. Thus even if one or more of the casings as discharged from the transfer mechanism may have a tendency to twist crosswise thereof, such tendency is overcome by engagement of the forward end of the casing with the side walls of the corresponding pair of teeth 94 so that the casing is directed to its proper position in the trough between rollers 27.

The chain 93, or equivalent supplemental trough-providing means, need not extend beyond the transfer station and should not extend to the drop-out section 81 of cam 28A. An equivalent arrangement would be a sprocket driven in synchronism with conveyor 21 and so disposed that its teeth at the transfer station are in substantially the same position as, and serve the above-described purpose of, teeth 94 of chain 93.

In the particular arrangement shown in Figs. 21 and 22, the chain 93 is driven by sprocket 95 mounted on an extension of the shaft 40 of the main conveyor sprocket 22. The idler sprocket 96 for chain 93 is somewhat beyond the transfer station so that at the transfer station the gaps between teeth 94 are there in alignment with corresponding troughs between rollers 27 of conveyor 21.

In troughs of machines such as previously described, there are occasions, due for example to deenergization or malfunctioning of the heating equipment, when casings should be removed from the conveyor to prevent unannealed or improperly annealed casings from being intermingled with properly annealed casings previously delivered to container F or equivalent. One arrangement for such purpose is shown in Fig. 23 or Fig. 24, and an alternative arrangement is shown in Figs. 25 and 26.

Referring to Figs. 23 and 24, the pressure bar is provided, beyond the heat-treating zone for the casings, with a hinged section 31X which may be swung from its normal full-line position (Fig. 24) to the dotted line position shown. By the time the casings arrive at this region of their travel, they have been to such extent laterally displaced by cam 28 that in absence of the restraint imposed by bar 31, they would fall off the conveyor. Hence, so long as the hinged section 31X is held in the dotted line position, the casings upon arrival at the drop-out zone defined by the hinged section 31X would fall out of the machine while in advance of container F.

In the particular construction shown in Figs. 23 and 24, the drop-out section 31X of cam 31 is connected beyond its hinge 98 to one end of bar 100. The other end of the bar is coupled to an extension of the armature 101 of an electromagnet 99. To discharge casings from the conveyor, the operator may lift the bar 100 or close a switch (not shown) in the energizing circuit of electromagnet 99, and, alternatively or in addition, the control switch for electromagnet 99 may be included in the control system for the frequency oscillator which supplies the heating coil in the annealing zone, so that upon deenergization or malfunctioning of that equipment, the hinged section 31X of the pressure bar is automatically raised to effect discharge of casings from the conveyor.

Referring to Figs. 25 and 26, the cam 28 or 28A previously described is provided with an auxiliary hinged section 28X which is connected by bar 100A to the core 101A of electromagnet 99A. Upon manual movement of bar 100A or upon energization of the electromagnet in any of the ways above described in connection with electromagnet 99 of Figs. 23 and 24, the hinged cam section 28X is swung to the dotted line position of Fig. 25 so that the casings upon their arrival at this region are pushed off the rollers 27 and beyond the pressure bar 31X. Thus, unannealed or improperly annealed casings are discharged from the machine in advance of container F.

What is claimed is:

1. An arrangement for handling shell casings and the like comprising an endless conveyor having transverse pockets along the conveyor, driving means for effecting continuous motion of said conveyor, structure for directing streams of shell casings in end-to-end relation from several sources and with the casings of each stream in similarly oriented end-to-end relation to a transfer station adjacent the path of said conveyor, and mechanism at said station operating in timed relation to said conveyor for transferring the successive groups of end shells of said streams to successive groups of pockets of said conveyor, the shells as transported by said conveyor being in side-by-side relation.

2. An arrangement as in claim 1 in which said conveyor pockets are formed by rollers spaced to support a shell casing between adjacent rollers, and structure cooperating with said rollers to rotate them and the casings supported thereby during movement of the conveyor.

3. A conveyor arrangement as in claim 2, in which a stationary cam adjacent the path of movement of said rollers engages the corresponding ends of said casings to displace the casings laterally of their direction of movement by the conveyor.

4. A conveyor arrangement as in claim 2, in which the rollers engage a track extending along their path of movement to effect rotation of the casings in the troughs defined by said rollers.

5. A conveyor arrangement as in claim 2, in which the axes of the rollers are inclined, and in which a pressure bar parallel to the axes of said rollers engages said casings on the side opposite their engagement by said rollers.

6. A conveyor arrangement as in claim 5, in which said bar has a gap permitting fall from said conveyor of casings having heir heavier ends uppermost.

7. An arrangement for handling shell casings and the like comprising a conveyor having transverse pockets spaced along the conveyor, structure defining a group of transfer pockets adjacent the path of said conveyor pockets, guide tubes for delivering shell casings to said transfer pockets, and reciprocating mechanism operating cyclically in timed relation to said conveyor effecting for each cycle transfer of a group of casings from said transfer pockets to a group of said conveyor pockets.

8. An arrangement as in claim 7 in which said guide tubes extend downwardly for gravity feed of casings to said transfer pockets, and in which said transfer pockets are provided with spring means preventing said casings falling therefrom but yielding to permit transfer of said casings therefrom by said reciprocating mechanism.

9. A shell casing transfer mechanism comprising structure defining a series of side-by-side compartments having open front walls, feed tubes respectively connected to the tops of said compartments for delivering casings end-on to said compartments, yieldable means for restraining the casings from passage through said front walls, and a linearly reciprocable slide having structure defining the back walls of said compartments and of vertical height approximately equal to the casing length, said slide being movable in one direction to push said casings from said compartments in side-by-side relation against the restraint of said yieldable means and movable in reverse direction in the same path to clear said feed tubes for delivery of another group of casings to said compartments.

10. A transfer mechanism as in claim 9 in which the yieldable means comprises leaf springs extending along opposite sides of said compartments and with spacing somewhat less than the casing diameter.

11. A transfer mechanism as in claim 9 in which the yieldable means comprises spring-biased balls projecting from opposite sides of said compartment with spacing somewhat less than the casing diameter.

References Cited in the file of this patent

UNITED STATES PATENTS

| | | |
|---|---|---|
| 976,483 | Mitchell | Nov. 22, 1910 |
| 1,247,664 | Giles | Nov. 27, 1917 |
| 1,320,504 | Spaulding | Nov. 4, 1919 |
| 1,437,409 | Evans et al. | Dec. 5, 1922 |
| 1,682,112 | Brooke | Aug. 28, 1928 |
| 1,899,976 | Muller | Mar. 7, 1933 |
| 2,154,844 | Harker et al. | Apr. 18, 1939 |
| 2,211,957 | MacMichael | Aug. 20, 1940 |
| 2,496,438 | Brandt | Feb. 7, 1950 |
| 2,603,340 | Warren et al. | July 15, 1952 |
| 2,615,556 | Hoopes et al. | Oct. 28, 1952 |
| 2,621,774 | Rourke | Dec. 16, 1952 |
| 2,664,215 | Bottenhorn | Dec. 29, 1953 |
| 2,697,509 | Cushman | Dec. 21, 1954 |